J. A. LUNDAHL.
ORANGE HOLDER.
APPLICATION FILED NOV. 10, 1916.

1,246,624.

Patented Nov. 13, 1917.

WITNESSES

INVENTOR
John A. Lundahl
BY
ATTORNEYS

UNITED STATES PATENT OFFICE.

JOHN AUGUSTINUS LUNDAHL, OF CHARLOTTE, ROCHESTER, NEW YORK.

ORANGE-HOLDER.

1,246,624.   Specification of Letters Patent.   Patented Nov. 13, 1917.

Application filed November 10, 1916. Serial No. 130,559.

*To all whom it may concern:*

Be it known that I, JOHN A. LUNDAHL, a citizen of the United States, and a resident of Charlotte, Rochester, in the county of Monroe and State of New York, have invented a new and Improved Orange-Holder, of which the following is a full, clear, and exact description.

My invention relates to an individual holder for oranges, grape fruit, or the like, and has for its prime object to provide a holder of the indicated character so constructed and arranged that the individual portion of fruit will be firmly held by the holder against accidental displacement, and whereby the fruit may be placed and removed with facility.

The novel construction whereby the stated object is attained will be clearly understood from the specific description following.

Reference is to be had to the accompanying drawings forming a part of this specification in which similar reference characters indicate the corresponding parts in all the views.

Figure 1:
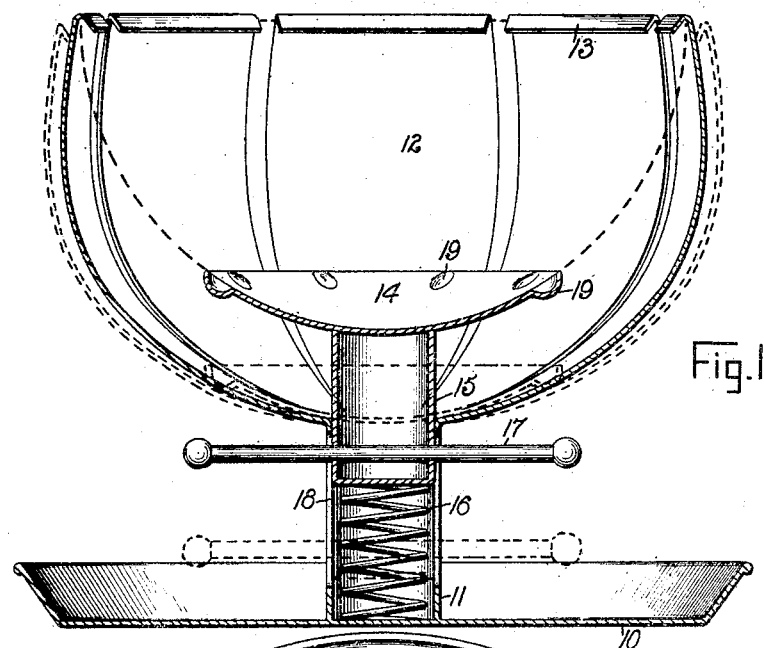
Figure 1 is a vertical section of a holder constructed in accordance with my invention, the section being taken on the line x—x, Fig. 2.
Figure 2:
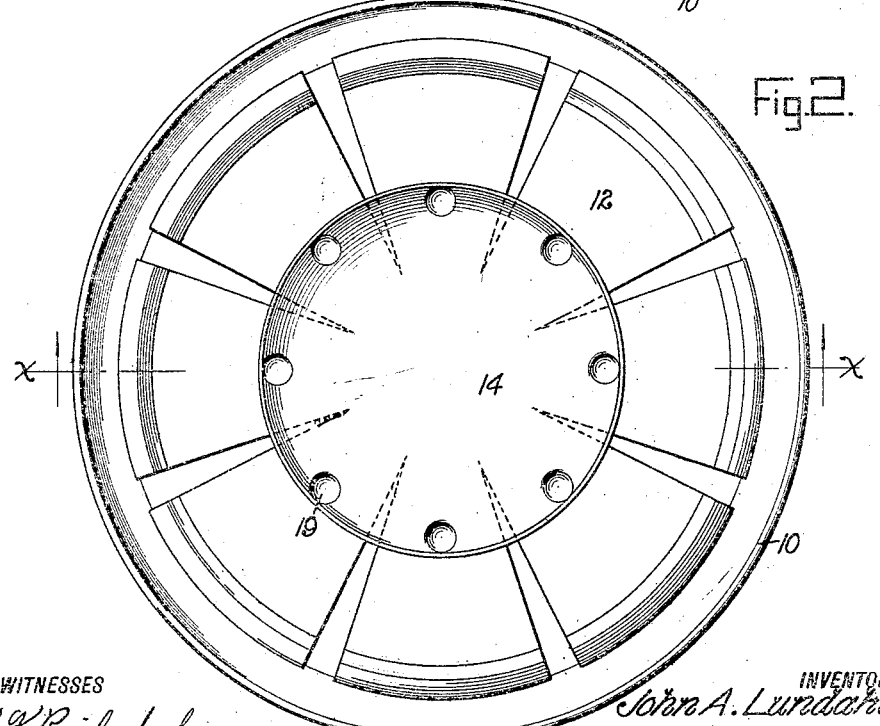
Fig. 2 is a plan view of said holder.

In forming a holder in accordance with my invention, a base 10 is provided, which preferably is in the form of a pan that fruit seeds and the like may be deposited therein. On the base and rising centrally therefrom is a tubular standard 11, the upper end of which is formed into a bowl 12 to receive the portion of fruit, such as an orange or grape fruit. The bowl is composed of separate resilient sections integral with or suitably secured to the standard. At the upper end each section of the bowl 12 is inturned to produce downwardly disposed gripping lips 13.

Centrally in the bowl 12 is a plunger designated generally by the numeral 14, the upper end or head of which is dished and broadened to constitute a seat for the fruit while the shank 15, which preferably is tubular for lightness, fits within and is vertically movable in the hollow standard 11. The lower end of the shank 15 of the plunger rests on a compression spring 16 in the standard 11 and on said plunger is a cross bar 17 which extends outward laterally through diametrically opposite vertical slots 18 in the standard.

The dished seat presented by the plunger 14 may be formed as shown with annular series of depressions 19, whereby the seat will have a better engagement with the fruit and lessen its liability of displacement when the fruit is placed on the seat.

In use, the plunger is depressed through the medium of the cross bar 17 until the dished seat of said plunger contacts with the resilient sections of the bowl 12 and expands said sections. The fruit may be then placed on the seat of the plunger as indicated in dotted lines, Fig. 1, whereupon the cross bar 17 is released permitting the plunger to rise and thereby permitting the expanded sections of the bowl to relax and bring the lips 13 thereof over the fruit. To release the fruit, it is necessary only to again depress the plunger through the medium of the bar 17.

Having thus described my invention I claim as new, and desire to secure by Letters Patent:

1. A holder of the class described including a base, a hollow standard on said base, a bowl formed on said standard at the upper end, said bowl being formed of separate resilient sections adapted to expand and contract, a plunger in the said standard, and a spring beneath the plunger, said plunger being formed at its upper end with a dished seat to receive the fruit.

2. A holder of the class described including a base, a hollow standard on said base, a bowl on the standard at the upper end and formed of separate resilient sections, a plunger movable in said standard, a compression spring beneath said plunger, and a cross bar on said plunger below the bowl, the base having vertical slots for the movement of said cross bar, the said plunger having a seat at its upper end to receive the fruit, said seat being movable into contact with the resilient sections of the bowl near the base of the latter when the plunger is depressed.

JOHN AUGUSTINUS LUNDAHL.

Copies of this patent may be obtained for five cents each, by addressing the "Commissioner of Patents, Washington, D. C."